(12) United States Patent
Shah et al.

(10) Patent No.: US 12,726,488 B2
(45) Date of Patent: Sep. 1, 2026

(54) AUTONOMOUS POLICY ENFORCEMENT POINT CONFIGURATION FOR ROLE BASED ACCESS CONTROL

(71) Applicant: Pulse Secure, LLC, San Jose, CA (US)

(72) Inventors: Viral Ileshkumar Shah, Bangalore (IN); Ganesh Nakhawa, Westford, MA (US); Krishna Nadh Manepalli, Bangalore (IN); Michael Riemer, Suamico, WI (US); Venkata Suresh Reddy Obulareddy, Bangalore (IN)

(73) Assignee: Pulse Secure, LLC, San Jose, CA (US)

( * ) Notice: Subject to any disclaimer, the term of this patent is extended or adjusted under 35 U.S.C. 154(b) by 250 days.

(21) Appl. No.: 17/638,835

(22) PCT Filed: Aug. 28, 2020

(86) PCT No.: PCT/US2020/048609

§ 371 (c)(1),
(2) Date: Feb. 27, 2022

(87) PCT Pub. No.: WO2021/041965

PCT Pub. Date: Mar. 4, 2021

(65) Prior Publication Data

US 2022/0337603 A1 Oct. 20, 2022

Related U.S. Application Data

(60) Provisional application No. 62/893,166, filed on Aug. 28, 2019.

(51) Int. Cl.
*H04L 9/40* (2022.01)

(52) U.S. Cl.
CPC ........ *H04L 63/1416* (2013.01); *H04L 63/102* (2013.01); *H04L 63/1408* (2013.01); *H04L 63/20* (2013.01); *H04L 63/0263* (2013.01)

(58) Field of Classification Search
CPC ............... H04L 63/0263; H04L 63/102; H04L 63/1408; H04L 63/1416; H04L 63/20
See application file for complete search history.

(56) References Cited

U.S. PATENT DOCUMENTS 7,664,048 B1 2/2010 Yung et al.
8,893,258 B2 * 11/2014 Rao ........................ H04L 63/08 709/227

(Continued)

OTHER PUBLICATIONS

International Search Report & Written Opinion for Application No. PCT/US2020/048609, dated Oct. 29, 2020, 8 pages.

(Continued)

*Primary Examiner* — Thomas J Dailey

(57) ABSTRACT

An example profiler device includes one or more processors implemented in circuitry and configured to monitor network traffic entering and exiting the protected network zone; identify one or more endpoints that interface with the protected network zone; compare network traffic characteristics of network traffic associated with the endpoints to network traffic characteristics of known device types to determine device types corresponding to the endpoints; assign one or more network policies to the identified endpoints according to the determined device types; and distribute data representing the assigned network policies to a policy enforcement point (PEP) device to cause the PEP device to enforce the network policies on network traffic, associated with the identified endpoints, entering and exiting the protected network zone.

17 Claims, 4 Drawing Sheets

(56) References Cited

U.S. PATENT DOCUMENTS

| | | | | |
|---|---|---|---|---|
| 2006/0026682 | A1 | 2/2006 | Zakas | |
| 2016/0352731 | A1* | 12/2016 | Mentze | H04L 63/0876 |
| 2020/0344203 | A1* | 10/2020 | Mermoud | H04L 61/5014 |
| 2020/0358794 | A1* | 11/2020 | Vasseur | G06F 16/285 |
| 2024/0154970 | A1* | 5/2024 | Cheethirala | H04L 63/101 |

OTHER PUBLICATIONS

Communication under Rule 71(3) EPC (the Notice of Allowance) for European Application No. 20772148.1, dated Apr. 11, 2024, 7 pages.

* cited by examiner

FIGURE 3
USER INTERFACE
CONNECTED DEVICE ATTRIBUTES STORE
DEVICE ATTRIBUTE DATABASE
TRAFFIC ANALYZER
DATA PROCESSOR
NETWORK INTERFACE
NETWORK INTERFACE

1125 DEVICE PROFILER

AUTONOMOUS POLICY ENFORCEMENT POINT CONFIGURATION FOR ROLE BASED ACCESS CONTROL

This application claims the benefit of U.S. Provisional Application No. 62/893,166, filed Aug. 28, 2019, the entire contents of which are hereby incorporated by reference.

TECHNICAL FIELD

A portion of the disclosure of this patent document may contain material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice shall apply to this document: Copyright 2019-Pulse Secure LLC.

TECHNICAL FIELD

This disclosure relates to network security.

BACKGROUND

Private networks, e.g., corporate, government, commercial and related private networks, include protected network resources, e.g., data, computer applications, data processing, private information access, secure business transactions, or the like and access to these resources is often fee-based. A network security infrastructure can be operated to establish private or protected network zones, e.g., subnets, wherein the subnets is subjected to a set of network policies that are implemented and enforced by the network security infrastructure. Network policy enforcement examples include establishing and enforcing network access control policies e.g., based attributes of the network device being accessed, of the user requesting the access, and/or of the context of the request. Additionally, the access control policies may limit the actions that the user can take e.g., read only, edit, share, delete or the like.

SUMMARY

In general, this disclosure describes techniques related to network security and a network security infrastructure. The network security infrastructure may be operated to deploy and enable enforcement points to enforce network policies in designated private or protected network zones or subnets. The technology specifically relates to identifying unknown network device types, identifying network policy element to apply to the newly identified network device types and enabling policy enforcement points to enforce the network policies without preventing the unknown device types from carrying out their intended purpose.

In one example, a method of providing network security includes monitoring, by a profiler unit that determines policies for protecting a protected network zone, network traffic entering and exiting the protected network zone; identifying, by the profiler unit, one or more endpoints that interface with the protected network zone; comparing, by the profiler unit, network traffic characteristics of network traffic associated with the endpoints to network traffic characteristics of known device types to determine device types corresponding to the endpoints; assigning, by the profiler unit, one or more network policies to the identified endpoints according to the determined device types; and distributing, by the profiler unit, data representing the assigned network policies to a policy enforcement point (PEP) device to cause the PEP device to enforce the network policies on network traffic, associated with the identified endpoints, entering and exiting the protected network zone.

In another example, a profiler device includes one or more processors implemented in circuitry and configured to: monitor network traffic entering and exiting the protected network zone; identify one or more endpoints that interface with the protected network zone; compare network traffic characteristics of network traffic associated with the endpoints to network traffic characteristics of known device types to determine device types corresponding to the endpoints; assign one or more network policies to the identified endpoints according to the determined device types; and distribute data representing the assigned network policies to a policy enforcement point (PEP) device to cause the PEP device to enforce the network policies on network traffic, associated with the identified endpoints, entering and exiting the protected network zone.

In another example, a computer-readable medium, such as a computer-readable storage medium, contains, e.g., is encoded with, instructions that cause a programmable processor to monitor network traffic entering and exiting the protected network zone; identify one or more endpoints that interface with the protected network zone; compare network traffic characteristics of network traffic associated with the endpoints to network traffic characteristics of known device types to determine device types corresponding to the endpoints; assign one or more network policies to the identified endpoints according to the determined device types; and distribute data representing the assigned network policies to a policy enforcement point (PEP) device to cause the PEP device to enforce the network policies on network traffic, associated with the identified endpoints, entering and exiting the protected network zone.

The details of one or more examples are set forth in the accompanying drawings and the description below. Other features, objects, and advantages will be apparent from the description and drawings, and from the claims.

DETAILED DESCRIPTION

Figure 1:
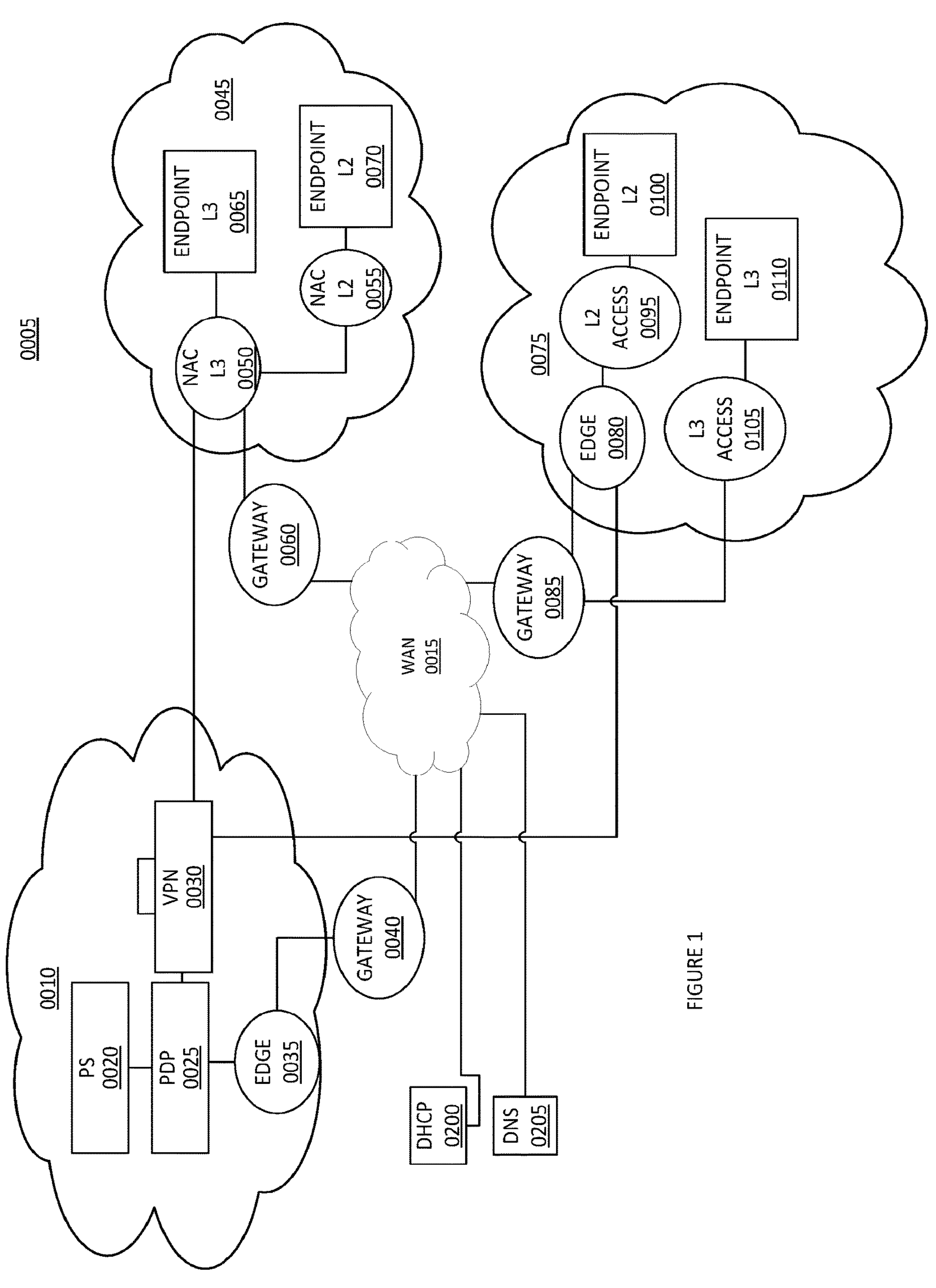
FIG. 1 depicts an example schematic diagram of a network environment equipped with network security devices operating according to one example of the techniques of this disclosure.

The following definitions are used throughout, unless specifically indicated otherwise:

| TERM | DEFINITION |
|---|---|
| OSI | The Open System Interconnection (OSI) model defines a networking framework to implement protocols in seven layers. |
| L2 | Layer 2 or the link layer encodes and decodes data a bit stream into a plurality of data packets and provides some error checking. |
| L3 | Layer 3 or the Network provides switching and routing using logical paths to transfer date between network nodes and is responsible for logical addressing and routing. |
| PEP | Policy Enforcement Point (PEP) A component of a policy based-network control system that enforces one or more network policies. |
| PDP | Policy Decision Point (PDP) A component of a policy-based-network control system that distributes policy enforcement point components to establish or update a Policy Enforcement Point (PEP). |
| MAC | Media Access Control or MAC address A unique identifier assigned to a network device. The MAC address is usable as a network address for Layer 2 local area networks. |
| NIC | Network Interface Controller: A unit operating on an endpoint device to interface with a network using a network protocol that is compatible with accessing the network. |
| Network Access Point | A network device configured as a network hub for connecting with one or more other network endpoints using a common communication protocol. |
| L2 datagram | A packet payload, and a packet header that a MAC address of the source device and destination device. L2 datagrams are used for IEEE 802 network technologies, including Ethernet, Wi-Fi and Bluetooth |
| DNS | Domain Name System, includes DNS servers used with the TCP/IP protocol suite to associate domain names with IP addresses. |
| VPN | Virtual Private Network |

The following item numbers are used throughout, unless specifically indicated otherwise:

| # | DESCRIPTION |
|---|---|
| 0005 | Network environment |
| 0010 | Private network security system |
| 0015 | Wide Area Network (WAN) infrastructure |
| 0020 | Policy Store (PS) |
| 0025 | Policy Decision Point (PDP) |
| 0030 | VPN Concentrator |
| 0035 | Edge router |
| 0040 | WAN gateway |
| 0045 | Protected network zone |
| 0050 | L3 NAC |
| 0055 | L2 NAC |
| 0060 | WAN gateway |
| 0065 | L3 endpoints |
| 0070 | L2 endpoints |
| 0075 | Unprotected network zone |
| 0080 | Edge router |
| 0085 | WAN gateway |
| 0090 | VPN Tunnel |
| 0095 | L2 access point |
| 0100 | L2 Endpoints |
| 0105 | L3 Access point |
| 0110 | L3 Endpoints |
| 0115 | L1 Endpoints |
| 0200 | DHCP server |
| 0205 | DNS server |

A problem with tracking and enforcing network policies may arise when unknown endpoint types attempt to access a protected network zone or are added to a protected network zone and there is no network access or use policy assigned to manage the unknown endpoint type. In many situations, unknown endpoint types are just denied access and it becomes the burden of the network administrator to manually characterize the device and associate an access control policy with the new endpoint device type. However, in view of the vast number of new endpoint devices being added to the worldwide network infrastructure daily, manually adding endpoints to protected network zones and selecting access policies to enforce for such devices has become untenable. This is especially relevant as vast numbers of Internet of Things (IoT) devices are added to everything from appliances, to smart buildings, vehicles, medical and industrial equipment, smartphones, wearable computer devices, and the like. Thus, there is a need in the art to autonomously evaluate new endpoint types attempting to access protected network zones or that have been added to a protected network zones and to determine characteristics of these new endpoint types and to associate an existing access control policy with the new endpoint type or to configure a new access control policy to associate with new the endpoint without involving the network administrator.

FIG. 1 depicts a schematic representation of a network environment (0005) including a private network security infrastructure or subnet (0010) interfaced with a Wide Area Network (WAN) infrastructure (0015). The network security infrastructure (0010) includes a Policy Store (PS) (0020), a Policy Decision Point (PDP) (0025) and a Virtual Private Network (VPN) Concentrator (0030). The network security infrastructure also includes an edge router (0035) which may be configured as a Network Access Controller (NAC)interfaced with a WAN gateway (0040). Preferably, the network security infrastructure is configured to deny access to resources of the network security infrastructure (0010) unless a request for access complies policies of the network security infrastructure. In a non-limiting example, the network security infrastructure is configured for network security as a service. The network security as a service provides network infrastructure operable to store network policy elements, to distribute network policy elements to appropriate policy enforcement points (PEP's). The network security as a service operates to deny access to resources of one or more protected network zones or subnets (0045) unless a request for access complies with policies of the protected network zone (0045).

A protected network zone or subnet (0045) includes a first Network Access Controller (NAC) (0050) interfaced with a WAN gateway (0060). A second NAC (0055) is interfaced with the first NAC (0050) and may be interfaced with the WAN gateway (0060). The first NAC (0050) is configured for OSI layer 3 network protocols, e.g., Internet Protocol (IP), Network Access Translation (NAT), Apple Talk DDP, or the like, and is interfaced with various L3 compatible endpoints (0065). The L3 endpoints (0065) may comprise network resources used by many users or may comprise user devices that are accessing network resources from inside the protected network subnet (0045). The L3 endpoints (0065) operating as protected network resources include one or more networked computer systems or servers configured to provide a network resource to authenticated and authorized users that can gain access the network resources. Other L3 endpoints (0065) are operated by end users, e.g., to access the network resources of the protected network zone (0045) from inside the protected network zone (0045) or to exchange network traffic with endpoints that are located outside the protected network zone.

The second NAC (0055) is configured for OSI layer 2 network protocols, e.g., Ethernet, Wi-Fi, WiMAX, Bluetooth, Challenge Handshake Authentication Protocol (CHAT), or the like and is interfaced with various L2 compatible endpoints (0070), i.e. using an L2 or in some cases an OSI layer L1 network communication protocol. The L2 endpoints (0070) are typically interfaced with a wired Local Area Network (LAN) access point or a Wireless Local Area Network (WLAN) access point, or with other endpoints e.g., by a mesh network connection, or the like. The L2 endpoints (0065) may comprise user endpoint devices configured to access the network resources of the protected network zone (0045) from inside the protected network zone (0045) or to exchange network traffic with endpoints that are located outside the protected network zone.

The L3 NAC and the L2 NAC each communicate with the network security infrastructure (0010) either over a Virtual Private Network (VPN) tunnel (0090) or over the VPN gateway (0060) as may be required to exchange network security updates and or to modify network security policies. Exchange examples can include receiving by the network security infrastructure network configuration updates and historical data from the NAC's and lists, of device types, of policy enforcement points, of denied access attempts, of connected users, or the like. Exchange examples can include receiving by the protected network zone (0045) policy updates, policy enforcement point updates or the like.

The L2 NAC (0055) may comprise separate LAN/WLAN access points and each L2 endpoint (0070) communicates with an L2 NAC to gain access to a local area network. Layer L2 and L1 protocols are not able to interpret IP addresses. Instead the L2 communication protocols exchange L2 Datagrams. L2 datagrams include a packet payload, up to four MAC addresses corresponding with the data source device and the source transmitting device and the date destination device and the destination device receiver. Each L2 endpoint (0070) is uniquely identified by the MAC address assigned to the Network Interface Controller (NIC) operating on the L2 endpoint (0070). L2 datagrams are only exchanged with other endpoints interfaced with the same LAN or WLAN and are not routed outside the LAN/WLAN environment. L2 datagrams list the MAC address of the datagram source endpoint and of the data-link destination endpoint. LAN and WLAN networks form a broadcast domain that broadcast L2 datagrams to every L2 endpoint (0075) interfaced with the L2 NAC (0055). Only the L2 endpoint having the MAC address matched to destination address of the L2 datagrams will accept the broadcasted L2 datagrams. The remaining endpoint devices of the subnet simply ignore the broadcast data-link frame. When no endpoint has the same MAC address as the destination address of a broadcasted data-link frame, the data-link frame is dropped. Alternately, the L2 NAC (0055) may include a Network Address Translation (NAT) unit, or the like configured to modify L2 datagrams to be routed over an L3 network e.g., to the L3 NAC (0050) or the WAN gateway (0060) to be routed out of the protected network zone to a destination IP address using a packet switched compatible communication protocol, e.g., TCP/IP.

The protected network zone (0045) also includes other network devices or endpoints (0115). The other network device endpoints are not necessarily operating as network resources of the protected network zone (0045), however the other network devices (0115) can and do utilize the network infrastructure, e.g., the WAN gateway (0060), the L2 NAC (0055) and the L3 NAC (0050) or some other network resource, e.g., a smart phone or another wireless network infrastructure. Other network endpoints (0115) may include computer peripherals, audio video equipment, smart phones, smart wearable devices, medical monitoring devices, building infrastructure equipment and controllers, sensors, video surveillance systems, vehicles, appliances, industrial machinery, scientific instruments, or the like. The other endpoints (0115) may include L2 and L3 configured network devices but also may include L1 or physical layer devices e.g., devices connected by Controller Area Network (CAN) bus, an Ethernet physical layer or Ether loop network, a USB hub, or the like and these other endpoints can and routinely do request and seek to communicate with network endpoints that are outside the protected network zone (0045) e.g., to exchange data with its manufacturer or with another service provider.

An unprotected protected network zone or subnet (0075) includes an edge router (0080) interfaced with a WAN gateway (0085) and with an L2 access point (0095) interfaced with L2 endpoints (0100) and with an L3 access point (0105) interfaced with L3 endpoints (0110). The edge router (0105) and/or the WAN gateway each includes a Network Address Translation (NAT) unit configured to modify L2 datagrams to be routed over an L3 network e.g., to a WAN based endpoint or to another unprotected network zone using a packet switched compatible communication protocol, e.g., TCP/IP.

The unprotected network zone (0075) may also include an L3 access point (0105) hosting L3 endpoints (0110) wherein the access point and the endpoints use a common L3 level network protocol. The L3 access point (0105) and the L2 access point (0095) are each interfaced with the edge router (0080) and each of the L3 and L2 access points can have an L3 compatible IP address. Accordingly the edge router (0080) and each of the L3 and L2 access points exchange L3 data packets e.g., exit packets being routed from the L3 or L2 access points to a destination IP address that is outside the unprotected subnet (0075) or as incoming packets being routed by the edge router to the L3 or L2 access points. In a nonlimiting example the L3 access point (0105) is associated with a Wireless Wide Area Network (WWAN) infrastructure such as a cellular radio or other radio network access point and the L3 endpoints (0110) are mobile devices equipped with a radio network access controller configured to access the L3 access point (0105). In either case, mobile user devices can access the WAN infrastructure (0015) over an unprotected L3 Access point (0105). Example WWAN communication protocols include but are not limited to protocols that are based on General Packet Radio Service (GPRS), e.g., 3G through 5G, Global Stem for Mobile (GSM) communication and other WWAN communication protocols including IEEE 802.11s, e.g., WiMAX network protocols, e.g., IEEE 802.16, e.g., Metropolitan Area Networks (MAN), or the like, all of which are capable of data packet exchanges with L3 configured endpoints. In a further nonlimiting example any of the L3 access points (0065, 0105) is a layer 3 switching device using a routing protocol to route packets using dynamic routing decisions.

According to the techniques of this disclosure, the private network security infrastructure (0010) interfaces with one or more protected network zones (0045) to provide network security services to each protected network zone. In a non-limiting example method, the network security services monitors network data packets passing through the L3 NAC (0050). This includes data packets entering the NAC from the VPN concentrator (0030), from the WAN gateway (0060) and from L3 endpoints (0065). The L3 NAC (0050) is configured as a PEP when the Policy Decision Point (0025) distributes access policy elements to the L3 NAC (0050) for enforcement thereby. The distributed access policy elements can relate to incoming data packets as well as to exiting data packets. The network access policies distributed to the L3 NAC and enforced by the L3 NAC (0050) may include blocking all network data packets received from unknown or unauthorized users or.

In a non-limiting example method, the network security services monitors network data packets passing through the L2 NAC (0055). This includes L2 datagrams and other forms of data received by the L2 NAC (0055) from the L2 end points (0070), from the WAN gateway (0060) and from the L3 NAC (0050). The L2 NAC (0055) is configured as a PEP when the Policy Decision Point (0025) distributes access policy elements to the L2 NAC (0055) for enforcement thereby. The distributed access policy elements can relate to policies for monitoring and controlling both incoming and outgoing data. The network access policies distributed to the L2 NAC and enforced by the L2 NAC (0055) may include blocking network data packets received from unknown or unauthorized users.

Figure 2:
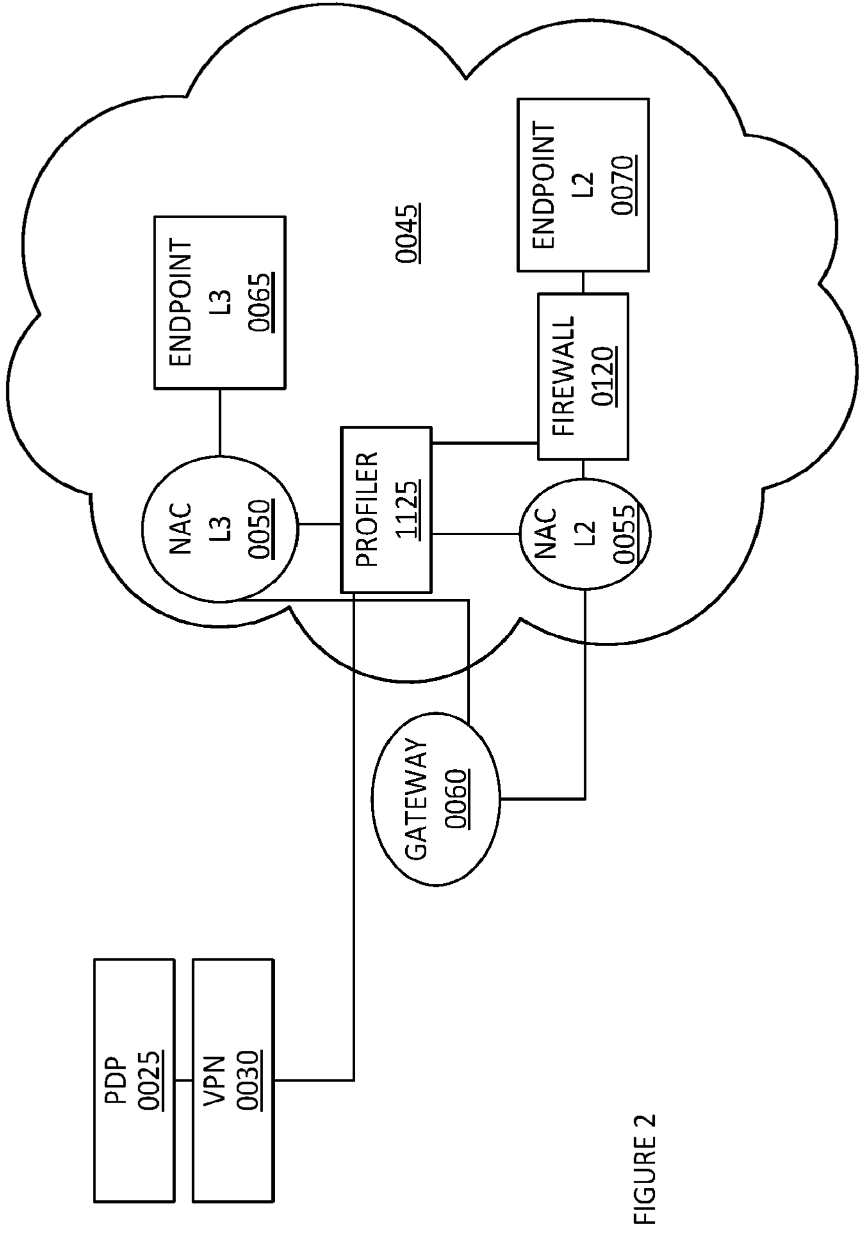
FIG. 2 depicts an example schematic diagram of a protected network zone that includes a profiler for discovering network devices being added to a protected network zone according to one example of the techniques of this disclosure.

Referring to FIG. 2, according to one example of the techniques of this disclosure, a profiler unit (1125) is at least interfaced with the L2 NAC (0055), which may comprise any L2 access point, and may be interfaced with the L3 NAC (0050) and the WAN gateway (0060). The profiler unit (1125) is configured to monitor network data traffic received by the L2 NAC (0055) from the L2 endpoints (0070), from the WAN gateway (0060) and/or from the L3 NAC (0050). As noted above, much of this network traffic is broadcasted to all the L2 endpoints (0070), so according to one example of the techniques of this disclosure the a profiler unit (1125) may gain access to the L2 network traffic simply by connecting to the L2 NAC (0055) as an L2 endpoint.

The profiler unit (1125) is configured to analyze the monitored L2 level network traffic, e.g., to collect relevant information therefrom including the source MAC address of the endpoint (0070), the destination MAC address of a receiving end point (0070), a MAC address of the source transmitter, a MAC address of the destination device receiver, the communication protocol, the authentication protocol, in some cases the Network Basic Input/output System (NetBIOS) addresses of the endpoint, as well as other characteristics of the network traffic that can identify the endpoint operating system and version, the endpoint manufacturer, or the like. Additionally, based on analysis of the monitored network traffic the profiler unit (1125) may predict future actions of an L2 endpoint. In an example, when an L2 device requests an IP address assignment from a Dynamic Host Configuration Protocol (DHCP) server (0200) and/or requests a domain name look up by a Domain Name System (DNS) server (0205) this action may predict an upcoming action of the L2 device, such as to request a communication session with a device that is outside the protected network zone (0045) or to gain access to an L3 network resource (0065) without passing through the L3 NAC (0050). When analyzing network traffic received from or being routed to the WAN gateway (0060), the profiler unit (1125) can determine a destination and a source IP address of data packets and compare those IP addresses with a network configuration list to determine if the IP addresses are known to the protected network zone (0045) and if not report the network traffic to the that are not under management by the network security infrastructure (0010).

The profiler unit (1125) is configured to analyze the monitored network traffic. While monitoring the profiler may detect L2 endpoints including IoTs already interfaced with an L2 access point or another endpoint interfaced with an L2 access point corresponding with the protected network zone (0045). The profiler unit (1125) and or the private network security infrastructure (0010) includes one or more databases, e.g., stored on the Policy Store (0020), for storing network traffic data corresponding with various device types or network traffic meta data corresponding with network traffic patterns. The databases can include information that relates a network traffic pattern with end point device manufacturers, with endpoint communication patterns, with end point temporal patterns, end point communication protocols, authentication protocols, or the like. Additionally, the one or more databases can associate device types that have been detected by the device profiler with network policy elements to be enforced, with PEP that can be used to enforce the policy elements and with a PDP that can distribute the network policy elements to be enforced to the PEP's that can be used to enforce the network policy elements. A non-limiting example profiler unit (1125) and methods for analyzing network traffic using the profiler unit are disclosed in related U.S. patent application Ser. No. 16/718,909, filed on 18 Dec. 2019, entitled Detecting Attacks and Quarantining Malware Infected Devices, which is incorporated herein.

The techniques of this disclosure include one or more PEP's corresponding with the L2 NAC (0055). In a non-limiting example the PEP is protected by a firewall (0120) operating on a data processor associated with the L2 NAC (0055) or associated with a nod corresponding with the L2 end point (0070) or the L3 NAC (0050). Additionally, the profiler unit (1125) is operable as a PDP to distribute policy enforcement elements to the firewall (0120) for enforcement by the firewall (0120). Thus, in situations where the profiler unit (1125) discovers an L2 endpoint that is already interfaced with the protected network zone (0045) without a PEP assignment or where the profiler unit (1125) discovers an L2 endpoint that is about to interface with an access point corresponding with the protected network zone (0045) the profiler unit (1125) analyzes network traffic characteristics of the newly discovered L2 device, if possible matches the network traffic characteristics of the newly discovered L2 device with network traffic characteristics of known L2 devices and assigns a device type to the undiscover discovered L2 device and then distributes appropriate policy enforcement elements to the firewall (0120) for enforcement thereby with interaction with an human administrator of the protected network zone (0045).

In a further aspect of these techniques, after an L2 device has been interfaced with an access point corresponding with the protected network zone (0045) the L2 device can be accessed by users that have been authenticated to access other network resources, e.g., L3 endpoints (0065), via the L3 NAC (0050). In particular, a user endpoint interfaced with the L2 NAC (0055) can attempt to communicate with any L2 endpoint (0070) by a broadcast message and may eventual gain access the L2 endpoints (0070) and modify operating modes of the L2 endpoints either purposely or inadvertently. To alleviate this problem, the firewall is further configured to restrict access to L2 devices based on user attributes such as user age, user security clearance, user department, user role, or the like, to establish user action attributes e.g., based on user role, such as read, delete, view, approve, modify, or the like. Additionally, the firewall (0120) is further configurable by the network security infrastructure (0010) to enforce resource attributes depending on the device type, department, security sensitivity, function, or the like.

In an example operating mode, a user is authenticated by the L3 NAC (0050) and the user and the user endpoint are authorized to communicate with protected endpoints (0065)

and (0070). Additionally, a user role is determined from a user profile or a default user role assigned by the L3 or L2 NAC or the network security infrastructure if a user role is not known. Additionally, for newly discovered endpoints where there is an incomplete device type match with known device type network traffic patterns the default user role may be assigned by the L3 or L2 NAC. Accordingly, a user attempting to access endpoints will be denied access unless the user role is matched with the user role assigned to the protected endpoint. As will be recognized, the profiler unit (1125) is equally capable of analyzing network traffic patterns corresponding with undiscovered L3 endpoints (0065) and with distributing policy elements to the L3 NAC (0050) and other PEP's operable by individual L3 and L2 endpoints.

Figure 3:
FIG. 3 depicts an example schematic diagram of a profiler unit according to one example of the techniques of this disclosure.

Referring now to FIG. 3 a nonlimiting example device profiler (1125) is shown in schematic view. The profiler includes a data processor and related data memory interfaced with one or more network interface devices. A traffic pattern analyzer operates on the data processor to compare selected network traffic patterns with device attribute data and compares the device attributes with connected device attributes to find a match. If no match is found, the selected network traffic patterns are analyzed to determine a device type corresponding with the selected network traffic patterns. The network security infrastructure is then operated to assign network access policies to the selected device or of there are no appropriate network access policies for the selected device network traffic to and from the selected device will be dropped or blocked.

The following Example is provided to illustrate certain aspects of the techniques of this disclosure. The example is in no way to be considered to limit the scope of this disclosure or the claims in any manner.

Rapid deployment of IoT devices operating with data link layer L2 communication protocols or in some cases physical layer devices interfaced with Controller Area Network (CAN) bus, an Ethernet physical layer or Ether loop network, a USB hub, or the like, has significantly impacted the ability of network security administrators to implement network policies to manage IoT devices. Data link network protocols such as 802.3 Ethernet 802.11 Wi-Fi or Wireless Ethernet are addressed above but many additional data link and physical layer network protocols, industrial network protocols, and peer to peer and mesh network protocols are used in various network environments including BACnet and BACnetIP used for building automation, Data Highway used in manufacturing automation.

According to a use case for the techniques of this disclosure, a control device is installed within a protected network zone. The control device is installed to control a network resource. In the present example, the network resource is a manufacturing automation device and the control device is a device controller configured to control the manufacturing automation device over a network connection. The control device communicates with the manufacturing automation device over a wireless network connection that does not include the, NAC L2 (0055), e.g., a peer to peer, mesh, cellular, or other such network. The NAC L2 broadcasts Network ID information which is detected by the manufacturing automation device but not the NAC L2 (0055) such that only the manufacturing automation device joins the NAC L2 network and is authenticated by the NAC L2. Periodically the control device attempts to establish a communication session with network resources that are outside the protected network zone e.g., to check for software updates and download and install the software updates, to allow remote service access, to send historical data, or the like. However, this communication is outside the protection of the protected network zone (0045).

As described above, a profiler unit (1125) actively monitors and analyzes network traffic at the L3 NAC, the L2 NAC and the WAN gateway (0060). The profiler unit (1125) identifies network traffic patterns associated with each of the control device as device that is not being managed by the network security infrastructure and analyzes information corresponding with the network traffic patterns corresponding with control device. If the device profiler identifies the network device type by comparing the network traffic patterns with network traffic pattern templates stored in databases of the network security infrastructure, a device type ID is submitted to the network security infrastructure and a set of policy elements is selected and distributed by the network security infrastructure to the firewall (0120) for enforcement thereby. In addition, depending on the newly discovered device type the assigned network policies may include a user role policy restriction, and the user role policy restriction is distributed to the firewall (0120) for enforcement thereby. Otherwise, if the device type is not determined and/or the policy storage manager (1020) has no policy information related to the identified device type the network security system (1000) may block access to the protected network zone or enforce a default policy for unrecognized L2 authenticated device types.

Figure 4:
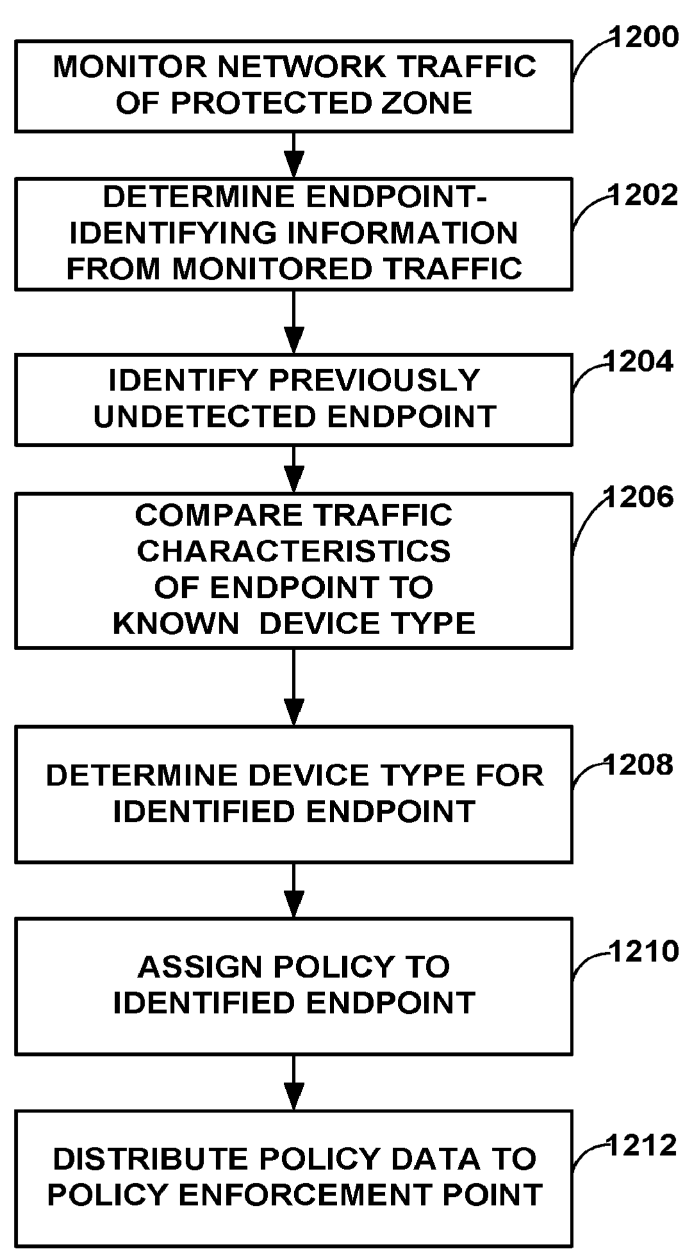
FIG. 4 is a flowchart illustrating an example method of providing network security for a protected network zone according to the techniques of this disclosure.

FIG. 4 is a flowchart illustrating an example method of providing network security for a protected network zone according to the techniques of this disclosure. The method of FIG. 4 is described with respect to profiler unit (1125) of FIGS. 2 and 3.

Profiler unit (1125) generally monitors network traffic of a protected network zone (1200), e.g., network traffic entering and exiting protected network zone (0045). This network traffic may flow to and from endpoints within protected network zone (0045). In some cases, profiler unit (1125) may not have determined that the endpoint sending or receiving the network traffic is present within protected network zone (0045).

According to the techniques of this disclosure, while monitoring the network traffic, profiler unit (1125) may determine endpoint-identifying information from the monitored network traffic (1202). For example, as discussed above, profiler unit (1125) may determine, for the monitored network traffic, one or more of a source media access control (MAC) address, a destination MAC, a communication protocol, an authentication protocol, or a Network Basic Input/output System (NetBIOS) address. Using this information, profiler unit (1125) may identify a previously undetected endpoint (1204). For example, if at least one of these pieces of information is not associated with a previously identified endpoint, profiler unit (1125) may determine that either a source or a destination of the network traffic is a previously undetected endpoint.

Profiler unit (1125) may then determine a policy for the newly identified endpoint. In particular, profiler unit (1125) compares traffic characteristics of the network traffic associated with the newly identified endpoint to traffic characteristics of endpoints of known device types (1206). Based on these comparisons, profiler unit (1125) may determine a device type for the newly identified endpoint (1208). Profiler unit (1125) then assigns a policy to the newly identified endpoint (1210) according to the determined device type for the newly identified endpoint. Profiler unit (1125) then distributes policy data to a policy enforcement point (e.g., NAC (0050) or firewall (0120) of FIG. 2) (1212) to cause the policy enforcement point to enforce the policy on traffic flowing to and from the newly identified endpoint. The policy data may include an identifier for the newly identified endpoint, e.g., a MAC address, and data representing the determined policy to be enforced on traffic flowing to and from the newly identified endpoint.

In this manner, the method of FIG. 4 represents an example of a method including monitoring, by a profiler unit that determines policies for protecting a protected network zone, network traffic entering and exiting the protected network zone; identifying, by the profiler unit, one or more endpoints that interface with the protected network zone; comparing, by the profiler unit, network traffic characteristics of network traffic associated with the endpoints to network traffic characteristics of known device types to determine device types corresponding to the endpoints; assigning, by the profiler unit, one or more network policies to the identified endpoints according to the determined device types; and distributing, by the profiler unit, data representing the assigned network policies to a policy enforcement point (PEP) device to cause the PEP device to enforce the network policies on network traffic, associated with the identified endpoints, entering and exiting the protected network zone.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer-readable media may include non-transitory computer-readable storage media and transient communication media. Computer readable storage media, which is tangible and non-transitory, may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer-readable storage media. It should be understood that the term "computer-readable storage media" refers to physical storage media, and not signals, carrier waves, or other transient media.

Various examples have been described. These and other examples are within the scope of the following claims.

What is claimed is:

1. A method of providing network security, the method comprising:

monitoring network traffic passing through network access controller (NAC) to enter and exit a protected network zone, by a profiler unit that determines policies for protecting the protected network zone and distributes access policy elements to the NAC for enforcement;

generating, by the profiler unit, a database including known network traffic characteristics corresponding to identified endpoint of the protected network zone and known device types of the identified endpoints;

while monitoring the network traffic, detecting an access request to the protected network zone;

determining first endpoint-identifying information from the monitored network traffic including the detected access request, the determined endpoint-identifying information including one or more of a source media access control (MAC) address, a destination MAC, a communication protocol, an authentication protocol, or a Network Basic Input/output System (NetBIOS) address;

in response to the first endpoint-identifying information not being associated with previously determined endpoint-identifying information of the identified endpoint devices, determining that either a source device or a destination device of the monitored network traffic including the detected access request is a previously undetected endpoint;

comparing, by the profiler unit, first network traffic characteristics of the monitored network traffic including the detected access request to the known network traffic characteristics of the database;

responsive to the first network traffic characteristics matching first known network traffic characteristics of the known network traffic characteristics, determining a device type of the previously undetected endpoint device is a first known device type of a first identified device corresponding to the first known network traffic characteristics;

assigning, by the profiler unit, a network policy to the previously undetected endpoint device according to the determined device type; and distributing, by the profiler unit to the NAC, data representing the assigned network policy to a policy enforcement point (PEP) device to cause the PEP device to enforce the network policy on network traffic flowing to and from the previously undetected endpoint device.

2. The method of claim 1, further comprising:

assigning one or more user role policy elements to the previously undetected endpoint device; and distributing the user role policy elements to the PEP device.

3. The method of claim 1, wherein the distributing the data representing the assigned network policy comprises distributing data associating an identifier of the previously undetected endpoint device with the network policy assigned to the previously undetected endpoint device.

4. A profiler device comprising one or more processors implemented in circuitry and configured to:

monitor network traffic passing through network access controller (NAC) to enter and exit a protected network zone;

generate a database including known network traffic characteristics corresponding to identified endpoint of the protected network zone and known device types of the identified endpoints;

while monitoring the network traffic, detect an access request to the protected network zone;

determine first endpoint-identifying information from the monitored network traffic including the detected access request, the determined endpoint-identifying information including one or more of a source media access control (MAC) address, a destination MAC, a communication protocol, an authentication protocol, or a Network Basic Input/output System (NetBIOS) address;

in response to the first endpoint-identifying information not being associated with previously determined endpoint-identifying information of the identified endpoint devices, determine that either a source device or a destination device of the monitored network traffic including the detected access request is a previously undetected endpoint;

compare first network traffic characteristics of the monitored network traffic including the detected access request to the known network traffic characteristics of the database;

responsive to the first network traffic characteristics matching first known network traffic characteristics of the known network traffic characteristics, determine a device type of the previously undetected endpoint device is a first known device type of a first identified device corresponding to the first known network traffic characteristics;

assign a network policy to the previously undetected endpoint device according to the determined device type; and distribute to the NAC data representing the assigned network policy to a policy enforcement point (PEP) device to cause the PEP device to enforce the network policy on the network traffic flowing to and from the previously undetected endpoint device.

5. The profiler device of claim 4, wherein the one or more processors are further configured to:

assign one or more user role policy elements to the previously undetected endpoint device; and distribute the user role policy elements to the PEP device.

6. The profiler device of claim 4, wherein to distribute the data representing the assigned network policy, the one or more processors are configured to distribute the data representing the assigned network policy comprise instructions that cause the processor to distribute data associating an identifier of the previously undetected endpoint device with the network policy assigned to the previously undetected endpoint device.

7. A non-transitory computer-readable storage medium comprising instructions that, when executed, cause a processor to:

monitor network traffic passing through network access controller (NAC) to enter and exit a protected network zone;

generate a database including known network traffic characteristics corresponding to identified endpoint of the protected network zone and known device types of the identified endpoints;

while monitoring the network traffic, detect an access request to the protected network zone;

determine first endpoint-identifying information from the monitored network traffic including the detected access request, the determined endpoint-identifying information including one or more of a source media access control (MAC) address, a destination MAC, a communication protocol, an authentication protocol, or a Network Basic Input/output System (NetBIOS) address;

in response to the first endpoint-identifying information not being associated with previously determined endpoint-identifying information of the identified endpoint devices, determine that either a source device or a destination device of the monitored network traffic including the detected access request is a previously undetected endpoint;

compare first network traffic characteristics of the monitored network traffic including the detected access request to the known network traffic characteristics of the database;

responsive to the first network traffic characteristics matching first known network traffic characteristics of the known network traffic characteristics, determine a device type of the previously undetected endpoint device is a first known device type of a first identified device corresponding to the first known network traffic characteristics;

assign a network policy to the previously undetected endpoint device according to the determined device type; and distribute to the NAC data representing the assigned network policy to a policy enforcement point (PEP) device to cause the PEP device to enforce the network policy on the network traffic flowing to and from the previously undetected endpoint device.

8. The non-transitory computer-readable storage medium of claim 7, further comprising instructions that cause the processor to:

assign one or more user role policy elements to the previously undetected endpoint device; and distribute the user role policy elements to the PEP device.

9. The non-transitory computer-readable storage medium of claim 7, wherein the instructions that cause the processor to distribute the data representing the assigned network policy comprise instructions that cause the processor to distribute data associating an identifier of the previously undetected endpoint device with the network policy assigned to the previously undetected endpoint device.

10. The method of claim 2, wherein the assigned network policy includes a restriction to access the protected network zone based on a user attribute of user of the previously undetected endpoint device.

11. The method of claim 10, wherein the user attribute includes one or more or a combination of a user age, a user security clearance, a user department, and a user role.

12. The method of claim 1, further comprising responsive to an incomplete device type determination based on the comparison between the first and the second network traffic characteristics, assigning a default user role to the previously undetected endpoint device.

13. The profiler device of claim 5, wherein the assigned network policy includes a restriction to access the protected network zone based on a user attribute of user of the previously undetected endpoint device.

14. The profiler device of claim 13, wherein the user attribute includes one or more or a combination of a user age, a user security clearance, a user department, and a user role.

15. The profiler device of claim 4, wherein the one or more processors are further configured to assign a default user role to the previously undetected endpoint device responsive to an incomplete device type determination based on the comparison between the first and the second network traffic characteristics.

16. The non-transitory computer-readable storage medium of claim 8, wherein:

the assigned network policy includes a restriction to access the protected network zone based on a user attribute of user of the previously undetected endpoint device; and the user attribute includes one or more or a combination of a user age, a user security clearance, a user department, and a user role.

17. The non-transitory computer-readable storage medium of claim 7, wherein the instructions, when executed, cause the processor to assign a default user role to the previously undetected endpoint device responsive to an incomplete device type determination based on the comparison between the first and the second network traffic characteristics.

* * * * *